United States Patent

[11] 3,633,765

| [72] | Inventors | Norman J. Bennett<br>North Kew;<br>Robert W. Haesler, Blackburn South,<br>Victoria, both of Australia |
|---|---|---|
| [21] | Appl. No. | 859,114 |
| [22] | Filed | Sept. 18, 1969 |
| [45] | Patented | Jan. 11, 1972 |
| [73] | Assignee | Vickers Ruwolt Proprietary Limited<br>Richmond, Victoria, Australia |
| [32] | Priority | Sept. 24, 1968 |
| [33] | | Australia |
| [31] | | 43,790/68 |

[54] LOADING AND UNLOADING APPARATUS
15 Claims, 18 Drawing Figs.

[52] U.S. Cl. .................................................. 214/1 BB,
53/281, 141/171, 214/340
[51] Int. Cl. .......................................................B65g 47/24,
B65g 43/62
[50] Field of Search........................................... 214/340, 1
Q; 198/33 AC; 141/171

[56] References Cited
UNITED STATES PATENTS

| 1,003,786 | 9/1911 | Pecht | 214/340 X |
| 1,158,289 | 10/1915 | Reininger | 214/340 X |
| 2,109,505 | 3/1938 | Rue et al. | 198/33 |

Primary Examiner—Robert G. Sheridan
Attorney—Woodhams, Blanchard & Flynn

ABSTRACT: Apparatus for loading substantially cylindrical side filled containers onto a filler machine, including, a cradle assembly for supporting and rotating the container with its axis substantially horizontal, and sensing means for detecting the container filler hole when that hole arrives at a predetermined position. A plunger is operative to locate within the filler hole in response to a signal received from the sensing means thereby holding the container in a desired position for engagement by carrier mechanism which functions to transport the container to a filling station of the filler machine. It is an object to correctly position the container filler hole for receiving a filler spear of the filler machine before locating the container at the filling station. Preferably, the apparatus is combined with a rotary turret filler machine, and the carrier mechanism is arranged for limited movement with that turret as a container is deposited on the machine, so as to allow substantially continuous operation of the filler machine.

INVENTORS
NORMAN JAMES BENNETT
ROBERT WILLIAM HAESLER
BY Woodhams, Blanchard & Flynn
ATTORNEYS

LOADING AND UNLOADING APPARATUS

This invention relates to apparatus for loading an article on to a filling, treatment, or testing station. The invention is particularly suitable for handling substantially cylindrical containers such as beer casks or barrels, and especially such casks which have their filler holes located in the sidewall. For convenience, the invention will be hereinafter described in relation to side-filled beer casks but it is not limited to that application.

Conventional cask-filling machines such as that according to U.S. Pat. No. 3,043,349, can be adapted for use with side-filled casks without much difficulty, but prior to the present invention satisfactory automatic loading and unloading apparatus has not been available. One of the many problems to be overcome in developing such apparatus, is that of obtaining rapid and accurate location of the filler hole to receive a filler spear of the machine.

It is a principal object of the present invention to provide loading apparatus which is relatively simple and is effective in operation. It is a further object of the invention to provide such apparatus which enables rapid and accurate location of the filler hole of side-filled containers such as casks or barrels. Another object of the invention is to provide loading apparatus for side-filled containers which is operative to locate and retain the container filler hole in a desired position prior to loading that container on to a filler machine.

It is another object of the invention to provide loading apparatus having a container receiving cradle which is operatively connected to turning means for rotating the container into a desired loading position, and which is movable into a release position when that container is engaged by carrier mechanism for transporting the container to a filler machine.

It is yet another object of the invention to provide loading apparatus having carrier mechanism for engaging and transporting a container to a rotatable turret filler machine, which mechanism is arranged for limited movement with the machine turret as it deposits a container on that turret.

A still further object of the invention is to provide a combination including the loading apparatus described above and a rotary turret filler machine. Yet another object of the invention is to provide such a combination including unloading apparatus for removing a filled container from the filler machine and depositing same at a discharge station.

It will be convenient to describe the invention in relation to a cask filling machine according to U.S. Pat. No. 3,043,349, but use of the apparatus is not limited to that machine.

The following description refers in more detail to these essential features and further optional features of the invention. To facilitate an understanding of the invention, reference is made to the accompanying drawings where these features are illustrated in preferred form. It is to be understood however, that the essential and optional features of the invention are not limited to the specific forms of these features as shown in the drawings.

In the drawings:

FIG. 4 is an end view of the apparatus shown in FIG. 3;

Figures 2, 5:
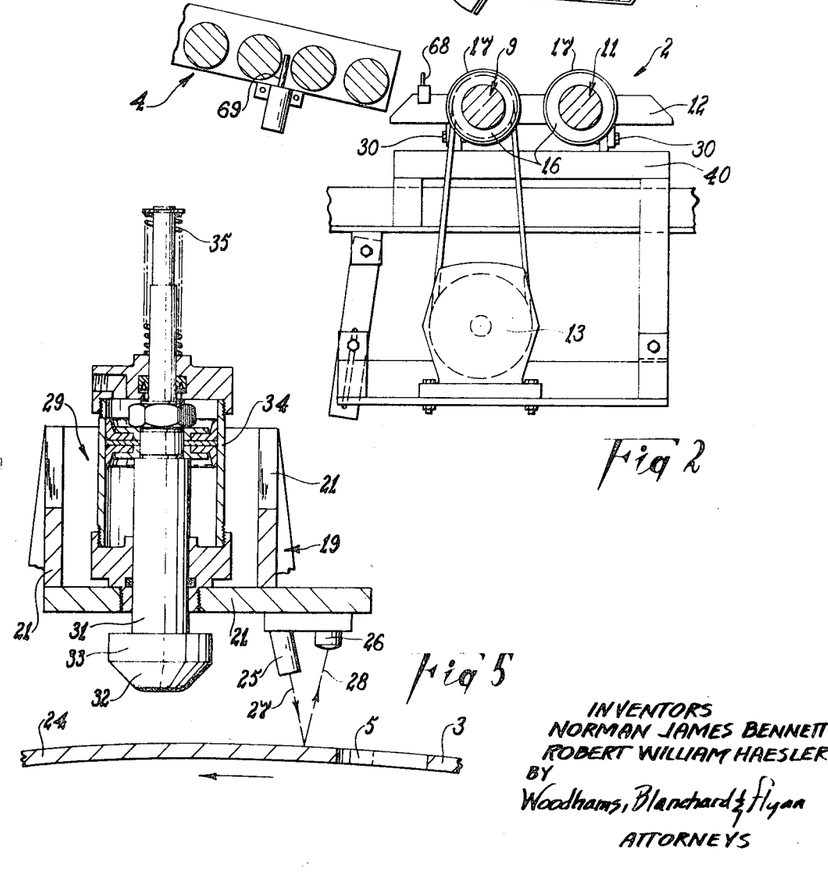
FIG. 2 is an enlarged cross-sectional view taken along line 11—11 of FIG. 1, parts being omitted for convenience of illustration.
FIG. 5 is an enlarged cross-sectional view of the filler hole sensing means of the apparatus according to FIGS. 3 and 4.
Figure 3:
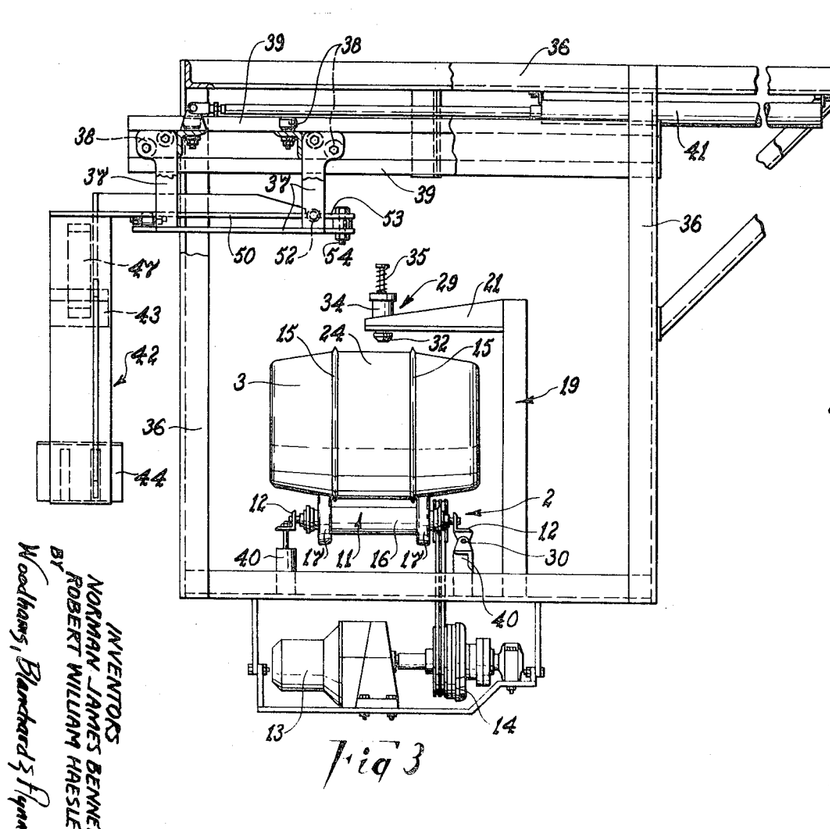
FIG. 3 is an enlarged side elevational view of the loading apparatus shown in FIG. 1.
Figure 6:
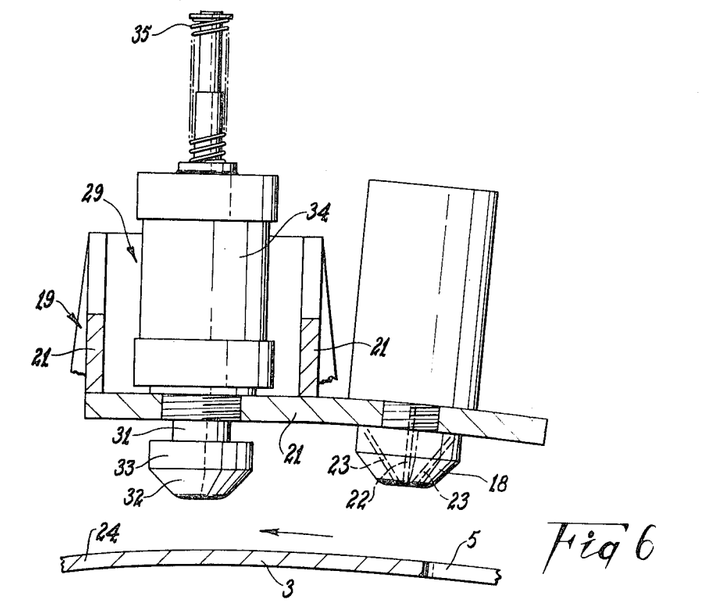
FIG. 6 is a side elevational view of an alternative form of sensing means.
Figure 7:
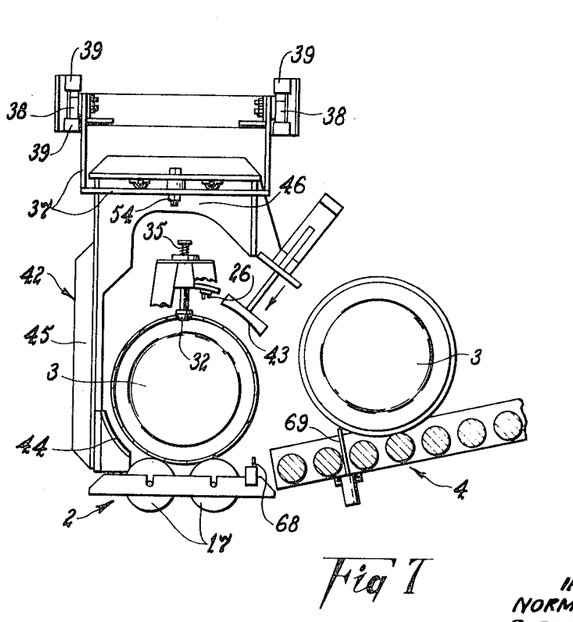
FIG. 7 is an end elevational view of the apparatus of FIG. 4 showing the cask contained therein held against rotation by the locating member.

Apparatus incorporating the invention includes support means 2 as shown in FIGS. 2 to 4 adapted to receive a cask 3 from any suitable feed conveyor 4 (see FIGS. 2 and 7). Preferably, the support means 2 comprises a receiving cradle arranged to support a cask 3 with its axis extending substantially horizontal and in a predetermined direction. Turning means as hereinafter described is associated with the cradle 2 for rotating the received cask 3 to locate the filler hole 5 (see FIGS. 5 to 7) thereof in a predetermined position.

Figure 1:
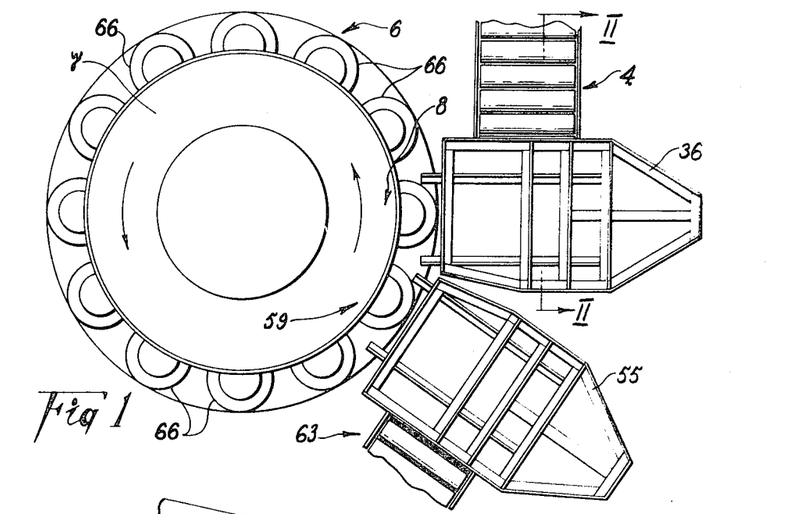
FIG. 1 is a semidiagrammatic plan view showing example apparatus according to the invention combined with a filler machine.

Assuming the cask 3 is to be filled by the aforementioned filler machine which is shown diagrammatically in FIG. 1 and is identified generally by numeral 6, the filler hole 5 is to be positioned in substantially vertical alignment above the cask axis as shown in FIG. 7. Also, the cask axis preferably extends radially relative to the axis of rotation of the turret 7 of the filler machine 6, and is thereby aligned with a loading station 8 of the machine 6.

In one form as shown in FIGS. 2 to 4, the turning means includes a pair of laterally spaced rollers 9 and 11 rotatably mounted on a frame 12 of the cask receiving cradle 2. At least the roller 9 is operatively connected to drive means such as a motor 13, preferably through an air clutch 14. A cask 3 received on the cradle 2 is caused to rotate about its axis by frictional engagement with the roller 9 when that roller is actuated by the drive motor 13.

Beer casks are usually of frustoconical shape at their end portions, and have two or more circular ribs 15 formed about the intermediate portion thereof. Thus, each roller 9 and 11 may have an intermediate undercut section 16 in which the cask ribs 15 are locatable, and two axially spaced wheel portions 17 each of which is engageable with a respective end portion surface of a cask 3. The peripheral surface of each wheel portion may slope at substantially the same angle as the engageable end portion of the cask 3 as shown in FIG. 3, and may have a band of rubber or other suitable material provided about its peripheral surface. The rubberband facilitates frictional engagement between the rollers 9 and 11 and a cask 3, and the rollers 9 and 11 are such as to aid in locating a cask 3 substantially in its correct axial position within the cradle 2.

Means for sensing the position of the filler hole 5 may take any convenient form. In one form as shown in FIG. 6, such means includes an air nozzle 18 carried by a suitable locater frame 19 (see FIGS. 3 and 4) to be positioned above a cask 3 located on the cradle 2 in substantially vertical alignment with the path traced by the filler hole 5 during rotation of the cask 3 by the turning means. The locater frame 19 may include an arm 21 overhanging at least part of the cradle 2 and being rigidly supported at one end and carrying the air nozzle 18 at its opposite end portion.

Preferably, the air nozzle 18 includes a main jet 22 having its axis extending substantially normal to and in substantial alignment with the axis of a cask 3 located on the cradle 2. A plurality of secondary jets 23 may be disposed in a circle about the main jet 22 and arranged so that their respective axes converge with each other and with the axis of the main jet 22, at or adjacent the outer surface 24 of a cask 3 located on the cradle 2. Such sensors are well known and are arranged to respond to a change in the pressure within the conic flow pattern defined by the jets 22 and 23. The sensor as used with this invention is arranged to respond in a known manner to reduction of pressure within the aforementioned flow pattern, which reduction will occur when the cask filler hole 5 is in the path of the jets 22 and 23, and is operatively connected to locating means (hereinafter described) in any known manner so that the aforementioned pressure reduction causes operation of the locating means to hold the cask 3 in a particular position.

In a preferred form however, the sensing means includes a light source 25 and a photoelectric cell 26 mounted on the arm 21 as shown in FIG. 5. The light source 25 is arranged to direct a light beam 27 towards a cask 3 located on the cradle 2, and the surface 24 of the cask 3 reflects that beam 27 as indicated by the line 28 in FIG. 5. The reflected beam 28 is received by and energizes the photoelectric cell 26 in a known manner, and the cell 26 is operatively connected to locating means 29 so as to cause actuation of that means when the cell 26 is deenergized. The aforementioned operative connection may be effected in any suitable manner. When the filler hole 5 is positioned so that the beam 27 passes therethrough, a reflected beam 28 is not produced and deenergization of the photoelectric cell 26 naturally results.

The locating means 29 includes a locating member, preferably in the form of a pneumatically actuated plunger 31, which may be also carried by the overhanging arm 21 of the locater frame 19. The plunger 31 may have a frustoconical nose portion 32 projecting axially from a head portion 33 which has a peripheral size and shape such that it cannot enter the filler hole 5. Furthermore, the plunger 31 is preferably located with its axis in substantially vertical alignment above the axis of a cask 3 located on the cradle 2, and the aforementioned path traced by the filler hole 5.

In the case of the FIG. 6 embodiment, the air nozzle 18 is located to one side of the plunger 31 so that during rotation of a cask 3, the filler hole 5 passes beneath the jet 22 just prior to being disposed directly beneath the locating plunger 31. The distance between the air nozzle 18 and the locating plunger 31 is predetermined as hereinafter described.

Similarly in the case of the FIG. 5 embodiment, the light source 25 is located to one side of the plunger 31 so that the filler hole 5 passes from beneath the light source 25 towards the plunger 31. The distance between the plunger 31 and the light source 26 is determined according to the speed of rotation of the cask 3, the distance of travel required by the plunger 31, and the time taken between disappearance of the beam 28 and actuation of the plunger 31.

As shown in FIG. 5, the plunger 31 is preferably actuated by introduction of fluid under pressure into the cylinder 34, and a spring 35 may be provided to return the plunger 31 to its raised position when the fluid pressure within the cylinder 34 drops to a predetermined level. Application of fluid pressure may be controlled by a solenoid valve (not shown) or any other appropriate control means.

Figure 10:
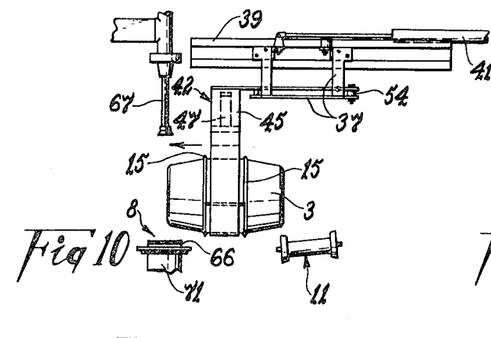
FIG. 10 shows the apparatus conveying a cask towards the filler machine.

Cradle release means may be provided to enable convenient removal of a cask 3 from the cradle 2. In one form as shown in FIGS. 3 and 4, that release means includes the cradle frame 12, which is pivotally mounted as at 30 on a support 40 at that side remote from the loading station 8, and a tilt actuator 40 operatively connected to the cradle frame 12 at its opposite side. The pivotal axis of the mounting 36 may be substantially horizontal and may extend substantially normal to the axes of the cradle rollers 9 and 11. The tilt actuator 40 may be a pneumatic piston-cylinder assembly adapted to move the adjacent end of the cradle frame 12 between a normal raised position in which the associated rollers 9 and 11 are substantially horizontal as shown in FIG. 3, and a release position in which the rollers 9 and 11 are tilted downwardly towards the loading station 8 as shown in FIG. 10.

A cask loading assembly associated with the locating means may include a carrier mechanism movably mounted on a support frame 36 as shown in FIGS. 1, 3 and 4. The support frame 36 preferably straddles the cradle 2 and defines a loading passage extending between that cradle 2 and the loading station 8 of the filler machine 6. In the preferred arrangement shown in FIG. 1, that passage extends substantially radially of the axis of rotation of the machine turret 7.

Figures 8, 9, 17, 18:
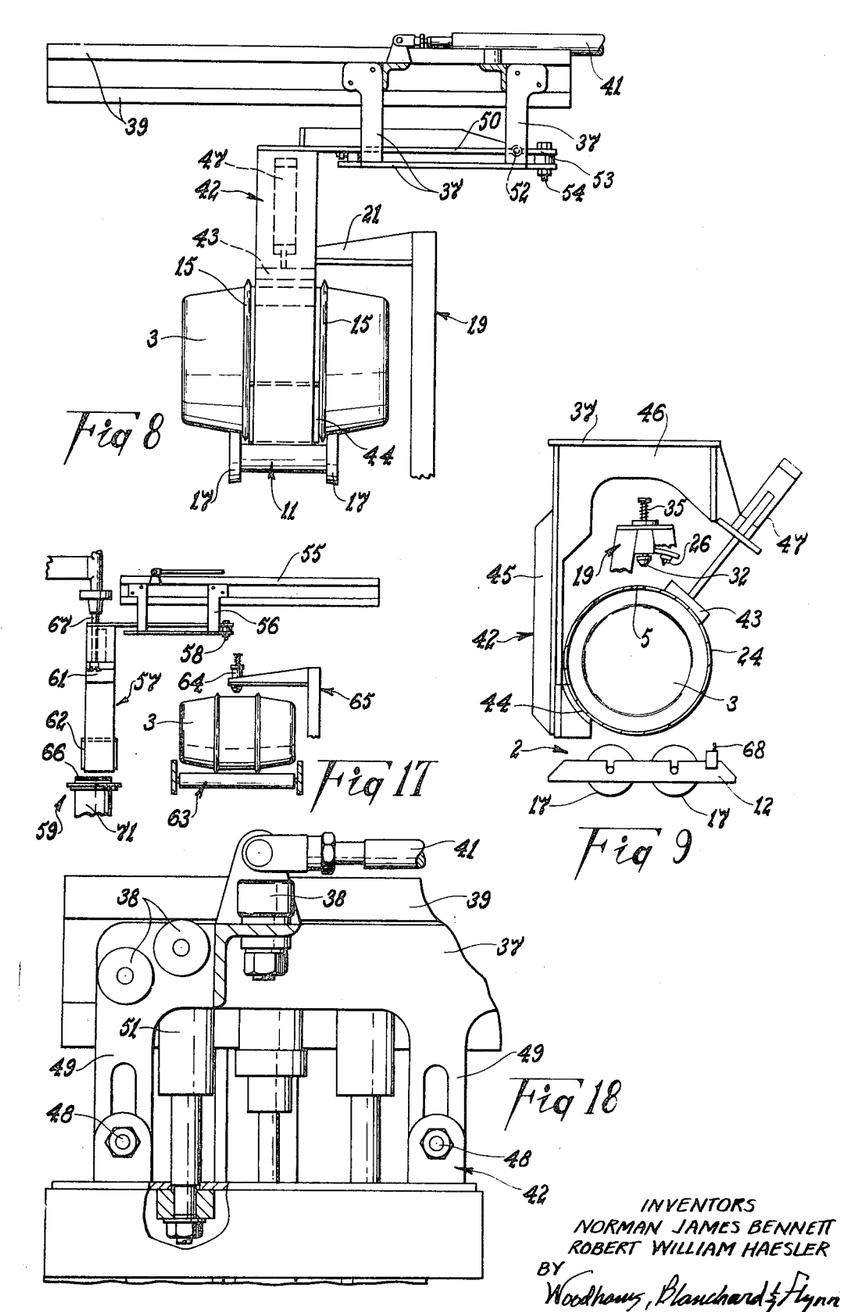
FIG. 8 is a side elevational view of the arrangement shown in FIG. 7.
FIG. 9 is a view similar to FIG. 7 but showing the cask held by the gripper jaws and the locating member withdrawn to its inoperative position.
FIG. 17 is a view similar to FIG. 16 but showing the unloading apparatus returned to its cask receiving position and the filled cask previously located at the discharge station being closed by a bung.
FIG. 18 is a fragmentary view of an alternative arrangement for allowing up and down movement of the loading apparatus gripper frame relative to the carrier frame of that apparatus.

The carrier mechanism may include a carrier frame 37 mounted on the support frame 36 for movement relative thereto in the direction of the loading passage. Preferably, the carrier frame 37 is located above the loading passage and has a plurality of guide rollers 38 attached thereto which cooperatively engage within guide tracks 39 which form part of, or are attached to, the support frame 36. Actuating means such as one or more pneumatic piston-cylinder assemblies 41 (see FIG. 3), is operatively connected to the carrier frame 37 to cause movement thereof between a receiving position in which it is located above the cradle 2 as shown in FIG. 9, and a discharge position in which it is located above the filler machine loading station 8 as shown in FIGS. 3 and 7.

Cask gripper means, also forming part of the carrier mechanism, is attached to the carrier frame 37 for movement therewith, and preferably includes a gripper frame 42 depending from the carrier frame 37 into the loading passage and carrying a pair of gripper jaws 43 and 44. In a preferred arrangement, the gripper jaw 43 is movable relative to the gripper frame 42 and the other jaw 44 is mounted stationary relative thereto.

The gripper frame 42 may include an upright leg section 45 having the stationary jaw 44 secured to the lower end portion thereof, and a lateral arm section 46 extending from the upper end portion of the leg 45 transverse to the loading passage. The arrangement is preferably such that in the receiving position of the carrier frame 37 as shown in FIGS. 7 to 9, the lateral arm 46 is disposed directly above the receiving cradle 2. It is also preferred that in that position of the carrier frame 37, the leg section 45 is disposed on that side of the cradle 2 remote from the feed conveyor 4, and the stationary jaw 44 is positioned to engage part of the surface 24 of a cask 3 received on the cradle 2 at a zone beneath a horizontal plane containing the cask axis.

The movable jaw 43 is preferably attached to the end portion of the lateral arm 46 remote from the upright leg section 45, and is adapted to engage part of the cask surface 24 diametrically opposite to that part which is engageable by the stationary jaw 44. Actuating means such as a pneumatic piston-cylinder assembly 47 may be operatively connected to the movable jaw 43 to move it between an inoperative position as shown in FIG. 4, and an operative position as shown in FIG. 9, in a direction extending substantially radially to the axis of a cask 3 located on the cradle 2.

Both jaws 43 and 44 may have arcuate cask engaging surfaces which conform substantially to the curvature of the cask surface 24 to be gripped. The cask engaging surfaces may be defined by respective pads of rubber or some other suitable material having a relatively low coefficient of friction. It is also preferred that the jaws engage a cask as described at a position intermediate the chimes 15 as shown in FIG. 8.

Preferably, the gripper frame 42 is connected to the carrier frame 37 for limited up and down movement relative thereto. Such a connection may include cooperating guide means secured to the gripper and carrier frames 42 and 37 respectively, and being such as to limit the degree of relative movement. For example as shown in FIG. 18, guide pins 48 secured to the gripper frame 42 may be slidably located within slotted guide plate 49 depending from the carrier frame 37. A dashpot assembly such as a pneumatic piston-cylinder assembly 51, may be operatively connected between the gripper and carrier frames 42 and 37 to allow relative upward movement of the gripper frame 42 and to normally urge the gripper frame 42 into its lower position.

In an alternative and preferred arrangement shown in FIG. 3, 4, and 8 to 11, the gripper frame 42 is pivotally connected to the carrier frame 37 as at 52 for up and down swinging movement relative thereto. For this purpose, part 50 of the frame 42 is movable about pivot 52 relative to another part 53 of the frame 42. Preferably, the gripper jaws 43 and 44 are mounted at a side of the gripper frame 42 adjacent to the loading station 8, and the pivotal mounting 52 is at the opposite side portion of the gripper frame 42 as shown. The axis of the pivot 52 preferably extends substantially horizontal and transverse to the direction of the loading passage. The gripper frame 42 may be urged into a normally lowered position by gravity or by any suitable biasing means, and stop means of any form may be provided to retain the frame 42 in that position against further downward movement.

The gripper frame 42 may be also connected to the carrier frame 37 for lateral movement relative thereto in a direction transverse to the loading passage, and in a preferred arrangement that connection is in the form of a further pivotal mounting 54 as shown in FIGS. 3 and 4. Preferably, the lateral pivot 54 is located on the frame part 53 adjacent the pivot 52 and has its axis extending substantially vertical. A spring or other biasing means (not shown) may be attached to the gripper frame 42 to urge it into a normal lateral position, and adjustable stop means (not shown) may be provided to limit its movement from that position.

In a simple form of the apparatus according to the invention, the loading assembly previously described also serves as an unloading assembly. For the sake of speed of operation however, it is generally preferred that an installation for serving machine 6 also includes a separate unloading assembly.

Figure 16:
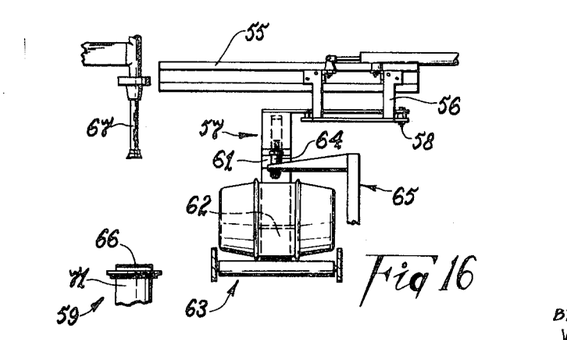
FIG. 16 is a side elevational view of the unloading apparatus showing a cask transported thereby from the filler machine to a discharge station.

The unloading assembly may be basically the same as the loading assembly described. That is, it includes a support frame 55 defining an unloading passage and having carrier mechanism movably mounted thereon. The carrier mechanism may be of the form previously described having carrier and gripper frames 56 and 57 respectively, although it is not generally necessary to have the gripper frame 57 connected for up-and-down movement relative to the carrier frame 56. It may be of advantage however, to connect the gripper frame 57 for lateral movement relative to the carrier frame 56 about a pivot 58. Also, the unloading carrier mechanism is in its receiving position when located over an unloading station 59 of the filler machine 6 as shown in FIG. 17, and is in its discharge position when located remote from the filler machine turret 7 as shown in FIG. 16.

Jaws 61 and 62 connected to the gripper frame 57 may be of the same general construction and operated in the same manner as the loader jaws 43 and 44. Thus, the unloading assembly is fundamentally the same as the loader assembly in both form and operation.

The unloading passage preferably extends radially away from the axis of the machine turret 7, and it is spaced an appropriate distance from the loading assembly as shown in FIG. 1. Any suitable discharge conveyor 63 or other collecting means may be provided to receive a filled cask 3 from the unloading assembly.

A bung locater may be provided as part of the unloading assembly, and preferably includes a plunger 64 carried on a frame 65 and positioned to direct a bung (not shown) into the filler hole 5 of a cask 3 when the cask is located at the discharge conveyor 63. The frame 65 may be substantially the same as the locater frame 19 previously described, and the relative position of the plunger 64 on that frame 65 may be substantially as described in relation to the locating plunger 31 and its respective frame 19.

The filler machine 6 may be substantially as described in the specification for U.S. Pat. No. 3,043,349, except that the cask supporting platforms 66 are preferably arcuate to properly support and locate a cask 3 on its side. Also, the filler spears 67 may require some modification because of the different depth of penetration between end-filled and side-filled casks, and the fact that the filler-hole size of each of those types of cask is generally different.

Having now described the principal component parts of a preferred practical embodiment of the present invention, the operation thereof is as follows.

A cask 3 on its side on the feed conveyor 4 and approaching the cradle 2 may actuate a switch 68 (see FIGS. 2 and 7) which energizes the drive motor 13 and/or actuates the clutch 14. Thus, the cask 3 is caused to rotate immediately it is received on the cradle rollers 9 and 11. Such rotation generally has the effect of orientating the cask 3 so that its axis is substantially horizontal, and also moves the cask 3 filler hole 5 towards the air nozzle 18 or light source 25, whichever embodiment is used. The air nozzle 18 or the light source 25 may be actuated automatically at substantially the same time as the roller drive. Any suitable releasable stop 69 (FIGS. 2 and 7) may be provided on the feed conveyor 4 to retain subsequent casks 3 pending removal of the first-mentioned cask from the cradle 2.

When the cask filler hole 5 is positioned such that the air jets or light beam 27, whichever is the case, is directed therein, the consequent reduced back pressure on the main air jet or lack of the reflected beam 28 respectively, causes actuation of appropriate control means in a known manner such that the clutch 14 is disengaged and the locating plunger 31 is actuated. In the time lag between sensing of the filler hole 5 and actuating the locating plunger 31, the filler hole 5 is moved a distance such as to be positioned with its axis substantially vertical. The tapered nose 32 of the locating plunger 31 engages within the filler hole 5 as shown in FIG. 7, thereby accurately positioning the filler hole 5 for subsequent reception of a filler spear 67.

In the case of the embodiment of FIG. 6, the sensing means is preferably such that reduction in the main jet back pressure caused by indentations in the cask surface 24, is insufficient to cause actuation of the aforementioned control means.

Upon complete location of the locating plunger 31 within the filler hole 5, the movable gripper jaw 43 is actuated to engage the cask 3 and force it firmly against the stationary jaw 44. The cradle tilt actuator 40 may be operated almost simultaneously with the movable jaw 43, thereby dropping the end of the cradle frame 2 to its release position as shown in FIG. 10.

The carrier frame 37 is preferably in its lowered position during actuation of the movable gripper jaw 43.

Figure 11:
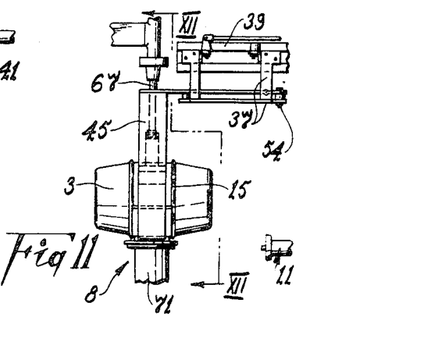
FIG. 11 is a view similar to FIG. 10 and showing the cask located on the filler machine.

When the cask 3 is firmly gripped by the jaws 43 and 44, the locating plunger 31 is withdrawn from the filler hole 5 as shown in FIG. 9, and the carrier frame 37 is caused to move towards its discharge position under the influence of the assemblies 41. The cradle 2 does not impede such movement because of the tilted disposition of the cradle frame 12 and rollers 9 and 11. In the discharge position of the carrier frame 37 as shown in FIG. 11, the cask 3 is located at the loading station 8 above one of the supporting platforms 66 of the filler machine 6, and each of those platforms is carried by a respective cam actuated ram 71. The cam track 72 is arranged to cause sudden upward movement of the platform 66 at the loading station 8 (see FIG. 13) as the cask 3 is located above it, so that the cask 3 is subsequently engaged by the platform 66 and lifted together with the gripper frame 42 towards a position in which one of the filler spears 67 is located in the filler hole 5.

The lateral pivot 54 of the gripper frame 42 allows that frame to move laterally with the machine turret 7 through a limited distance, thereby avoiding the necessity of stopping the turret 7 during the entire loading operation. In fact, rotation of the turret 7 may continue without pause if desired.

Preferably, the movable jaw 43 is located at the leading side of the gripper frame 42 relative to the direction in which it may be moved by the turret 7 through the intermediary of a cask 3 at the loading station 8.

Figures 12, 13:
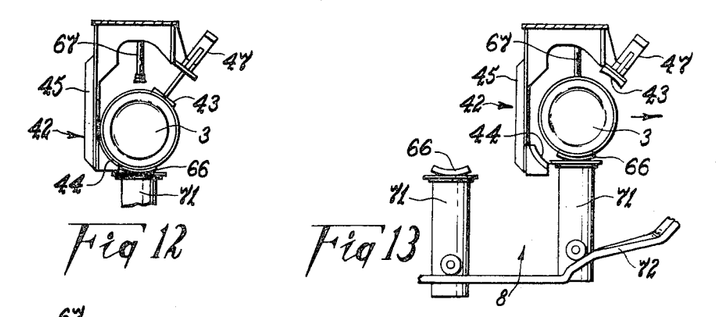
FIG. 12 is a cross-sectional view taken along line XI1—XI1 of FIG. 11.
FIG. 13 is a view similar to FIG. 12 but showing the cask being lifted on to an associated filler spear and released by the gripper jaws.

As the filler spear 67 enters the filler hole 5, the movable gripper jaw 43 is returned to its inoperative position and the dashpot assembly 51, or the force of gravity, may simultaneously move the gripper frame 42 into its lowered position to clear the stationary jaw 44 from the cask 3, all as shown in FIG. 13. Once the jaws 43 and 44 are released from the cask 3, the gripper frame biasing means functions to return that frame 42 to its normal lateral position. The carrier frame 37 is thereafter returned to its receiving position for substantially immediate repetition of the foregoing cycle.

Figure 14:
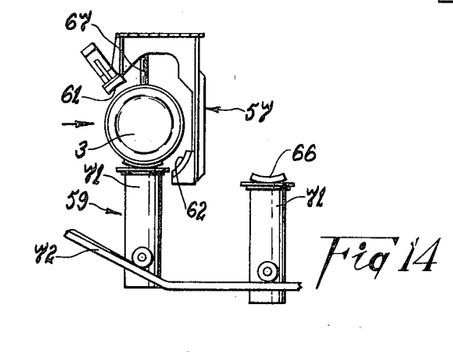
FIG. 14 shows a filled cask being received by unloading apparatus.
Figure 15:
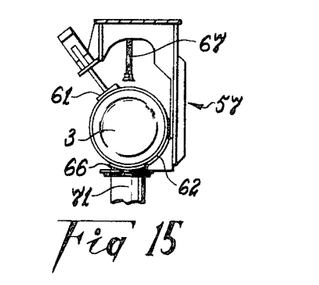
FIG. 15 is a view similar to FIG. 14 and showing the cask engaged by the unloading apparatus.

The filler machine 6 functions in a known manner to carry the cask 3 away from the loading station 8 and progressively fill same. The filled cask 3 is subsequently carried by the machine turret 7 to the unloading station 59 as shown in FIG. 14, at which it is engageable by the gripper jaws 61 and 62 of the unloading assembly as shown in FIG. 15. A switch (not shown) may be automatically actuated as that cask 3 approaches the unloading station 59 so as to cause the unloading carrier frame 56 to move from its discharge position to its receiving position. The movable gripper jaw 61 is actuated to clamp the filled cask 3 against the stationary jaw 62 as the associated supporting platform 66 lowers to clear that cask 3 from its respective filler spear 67. Lowering movement of the platform 66 continues and the carrier frame 56 is caused to return towards its discharge position with the filled cask 3 firmly held by the gripper jaws 61 and 62 as shown in FIG. 16.

At the discharge position of the unloading carrier mechanism, an operator may place an appropriate bung in the filler hole 5 of the cask 3 or over the lower end of the bung plunger 64, whichever is desired, and subsequently cause actuation of that plunger so as to drive the bung firmly into position within the filler hole 5 of the filled cask 3. Actuation of the plunger 64 may cause subsequent release of the movable gripper jaw 61 so as to deposit the filled and sealed cask 3 on to the discharge conveyor 63 as shown in FIG. 17.

The unloading carrier mechanism almost immediately returns towards its receiving position to collect a further-filled cask 3.

The various actuating means are preferably interlocked in a known manner so that any one operation will not be affected until a preceding operation has been completed. The cyclic speed of the loading and unloading apparatus is controlled by the rate of output of the filler machine 6, and will automatically adjust to compensate for any increase or decrease in the rate of output of the filler machine 6 by the resetting of some cam valves (not shown) for example.

Furthermore, although some of the various actuators have been described as pneumatically operated, it will be appreciated that hydraulic or electrical actuators could be used in their stead.

It will be understood from the foregoing description that the present invention provides an extremely simple and effective apparatus for loading and unloading articles such as casks or barrels, and that apparatus has the particular advantage of enabling convenient and accurate location of the filler hole in side-filled casks or barrels.

Having now described our invention, what we claim as new and desire to secure by Letters Patent is:

1. Loading apparatus for a substantially cylindrical container having a side filler hole, including; movable support means for receiving and supporting said container with its axis substantially horizontal when said support means is in a support position, turning means for rotating said container about its axis while mounted on the support means, sensing means operative to detect the filler hole of said container when that hole arrives at a predetermined position during said rotation, a locating member operative in response to detection of said filler hole by the sensing means to engage within the filler hole and retain the container in a loading position against further rotation by said turning means, a carrier mechanism engageable with said container and movable to carry the engaged container from the support means to a treatment station while said container remains in said loading position, and means for moving the support means into a release position when the container is engaged by the carrier mechanism for movement to the treatment station.

2. Loading apparatus for a substantially cylindrical container having a side filler hole, including; support means for receiving and supporting said container with its axis substantially horizontal and including, a cradle frame and a pair of laterally spaced rollers rotatably mounted on the cradle frame, said rollers being arranged to support the container for rotation and having their axes substantially parallel, turning means for rotating said container about its axis while mounted on the support means and including at least one of said rollers and drive means operatively connected to that roller, sensing means operative to detect the filler hole of said container when that hole arrives at a predetermined position during said rotation, a locating member operative in response to detection of said filler hole by the sensing means to engage within the filler hole and retain the container in a loading position against further rotation by said turning means, carrier mechanism engageable with said container and movable to carry the engaged container from the support means to a treatment station while in said loading position, and means for moving the support means into a release position when the container is engaged by the carrier mechanism for movement to the treatment station.

3. Apparatus according to claim 2, wherein said release means includes a pivotable mounting for the cradle frame and a tilt actuator operative to move that frame about the pivotable axis of said mounting, said mounting being located adjacent one end of said rollers and having its axis extending substantially horizontal and substantially at right angles to the axes of said rollers, and said tilt actuator is connected to the cradle frame adjacent the opposite end of said rollers and is operative to move the cradle frame between a normal position in which the roller axes are substantially horizontal and a release position in which the roller axes slope downwardly from said one end of the rollers.

4. Loading apparatus for a substantially cylindrical container having a side filler hole, including; support means for receiving and supporting said container with its axis substantially horizontal, turning means for rotating said container about its axis while mounted on the support means, sensing means operative to detect the filler hole of said container when that hole arrives at a predetermined position during said rotation, a locating member operative in response to detection of said filler hole by the sensing means to engage within the filler hole and retain the container in a loading position against further rotation by said turning means, said locating member including a plunger connected to a locater frame above the support means so that said container can be located on the support means beneath the plunger, said plunger being mounted for up-and-down movement relative to the locater frame and having a frustoconical nose portion at its lower end for location within said filler hole, said nose portion having a maximum diameter larger than the diameter of the filler hole, and carrier mechanism engageable with said container and movable to carry the engaged container from the support means to a treatment station while in said loading position.

5. Apparatus according to claim 4, wherein release means is provided for moving the support means into a release position when the container is engaged by the carrier mechanism for movement to the treatment station.

6. Apparatus according to claim 1, wherein said sensing means includes an air nozzle arranged to discharge an air jet toward said container located on the support means, and pressure-sensitive means operative to actuate the locating member when the back pressure in said air jet drops below a predetermined level, the arrangement being such that the air jet back pressure is greater than said predetermined level when the jet impinges on the sidewall of said container and is below that level when the jet passes through the filler hole of said container.

7. Apparatus according to claim 6, wherein the locating member includes a plunger connected to a locater frame above the support means so that said container can be located on the support means beneath the plunger, said plunger being mounted for up-and-down movement relative to the locator frame and having a frustoconical nose portion at its lower end for location within said filler hole, said nose portion having a maximum diameter larger than the diameter of the filler hole, and said air nozzle is attached to the locater frame at one side of the plunger so as to be spaced therefrom in the direction of rotation of said container, said direction of rotation being such that the filler hole passes from beneath the air nozzle towards the plunger.

8. Apparatus according to claim 1, wherein said sensing means includes a photoelectric cell and a light source arranged to direct a light beam on to the outer surface of said container located on the support means to produce a reflected beam which is received by and energizes said photoelectric cell, said reflected beam not being produced when the directed light beam passes through the filler hole of said container, and said locating member is operatively connected to the sensing means to be operated upon deenergization of the photoelectric cell.

9. Apparatus according to claim 8, wherein the locating member includes a plunger connected to a locater frame above the support means so that said container can be located on the support means beneath the plunger, said plunger being mounted for up-and-down movement relative to the locater frame and having a frustoconical nose portion at its lower end for location within said filler hole, said nose portion having a maximum diameter larger than the diameter of the filler hole, and said light source is attached to the locater frame at one side of the plunger so as to be spaced therefrom in the direction of rotation of said container, said direction of rotation being such that the filler hole passes from beneath the light source towards the plunger.

10. Apparatus according to claim 1, wherein said carrier mechanism is supported by a support frame and includes, a carrier frame mounted on the support frame for movement relative thereto, actuation means operatively connected to the carrier frame for moving it between a container receiving position and a container discharge position, and container gripper means attached to said carrier frame for movement therewith.

11. Apparatus according to claim 10, wherein said support frame straddles the support means and defines a loading passage extending between the support means and the treatment station, said carrier frame is movably supported on guide tracks which are attached to the support frame to guide the carrier frame in the direction of the loading passage, and said guide tracks are arranged so that the carrier frame is disposed above the support means in its receiving position and is located adjacent the treatment station in its discharge position.

12. Apparatus according to claim 10, wherein said container gripper means includes a gripper frame having a pair of gripper jaws mounted thereon, a fixed one of said jaws being attached to the lower end portion of a downwardly depending leg section of the gripper frame for engagement with a side surface of said container below the axis thereof, and a movable one of said jaws being mounted for engagement with said container in opposed relationship to said fixed jaw so that the container is held between those jaws.

13. Apparatus according to claim 12, wherein said movable jaw is movable relative to the gripper frame between operative and inoperative positions in a direction radially of the container under the influence of a jaw actuator.

14. Apparatus according to claim 12, wherein said gripper frame is connected to the carrier frame for limited up-and-down movement relative thereto to allow the container to be lifted at the discharge position of the carrier frame before being completely released by the gripper jaws.

15. Apparatus according to claim 12, wherein said gripper frame is connected to the carrier frame for limited lateral movement relative thereto to allow the container to be moved laterally at the discharge position of the carrier frame before being completely released by the gripper jaws, and biasing means is connected to the gripper frame to urge it into a normal neutral position relative to the carrier frame.

* * * * *